United States Patent
Yazaki et al.

(10) Patent No.: US 12,366,292 B2
(45) Date of Patent: Jul. 22, 2025

(54) SHIFT MECHANISM OF OUTBOARD MOTOR, AND MOUNT STRUCTURE OF SHIFT MECHANISM

(71) Applicant: HONDA MOTOR CO., LTD., Tokyo (JP)

(72) Inventors: Makoto Yazaki, Wako (JP); Toru Kimura, Wako (JP); Naoki Aikawa, Wako (JP); Tsuyoshi Harada, Wako (JP); Yasukata Kohashi, Wako (JP); Hikaru Ikeda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 697 days.

(21) Appl. No.: 17/616,212

(22) PCT Filed: Jun. 7, 2019

(86) PCT No.: PCT/JP2019/022786
§ 371 (c)(1),
(2) Date: Dec. 3, 2021

(87) PCT Pub. No.: WO2020/246034
PCT Pub. Date: Dec. 10, 2020

(65) Prior Publication Data
US 2022/0316591 A1    Oct. 6, 2022

(51) Int. Cl.
*F16H 61/32* (2006.01)
*B63H 20/14* (2006.01)
*F16H 61/36* (2006.01)

(52) U.S. Cl.
CPC .............. *F16H 61/32* (2013.01); *B63H 20/14* (2013.01); *F16H 61/36* (2013.01); *F16H 2061/326* (2013.01)

(58) Field of Classification Search
CPC .... F16H 61/32; F16H 61/36; F16H 2061/326; B63H 20/14; B63H 21/21; B63H 2021/216
See application file for complete search history.

(56) References Cited

U.S. PATENT DOCUMENTS

2003/0224672 A1    12/2003  Takada et al.
2004/0082235 A1 *   4/2004  Ochiai .................. B63H 21/22
                                                        440/84

(Continued)

FOREIGN PATENT DOCUMENTS

JP    2004-001638    1/2004
JP    2004-244003    9/2004

(Continued)

OTHER PUBLICATIONS

International Search Report and Written Opinion for International Application No. PCT/JP2019/022786 mailed on Aug. 27, 2019, 11 pages.

*Primary Examiner* — Andrew Polay
(74) *Attorney, Agent, or Firm* — Amin, Turocy & Watson, LLP

(57) ABSTRACT

A shift mechanism of an outboard motor has an electric actuator having a movable rod, and a guide structure for guiding a linear motion of a sliding body connected to the movable rod. In addition, the shift mechanism includes a link rod connected to the sliding body and bent to extend in a direction different from the direction of the linear motion of the sliding body. Furthermore, the shift mechanism includes a shift shaft part which is connected to the link rod, performs a rotational motion on the basis of a displacement of the link rod, and switches a range of a transmission mechanism provided below on the basis of the rotational motion.

8 Claims, 11 Drawing Sheets

(56) References Cited

U.S. PATENT DOCUMENTS

| | | |
|---|---|---|
| 2005/0003717 A1 | 1/2005 | Yazaki et al. |
| 2006/0046585 A1 | 3/2006 | Harada et al. |
| 2007/0287340 A1* | 12/2007 | Oguma ................ B63H 21/22 440/75 |
| 2012/0231684 A1 | 9/2012 | Kuriyagawa et al. |
| 2015/0251742 A1 | 9/2015 | Mori |

FOREIGN PATENT DOCUMENTS

| | | |
|---|---|---|
| JP | 2005-014724 | 1/2005 |
| JP | 2006-62478 | 3/2006 |
| JP | 2007-331483 | 12/2007 |
| JP | 2012-183931 | 9/2012 |
| JP | 2014-061802 | 4/2014 |

* cited by examiner

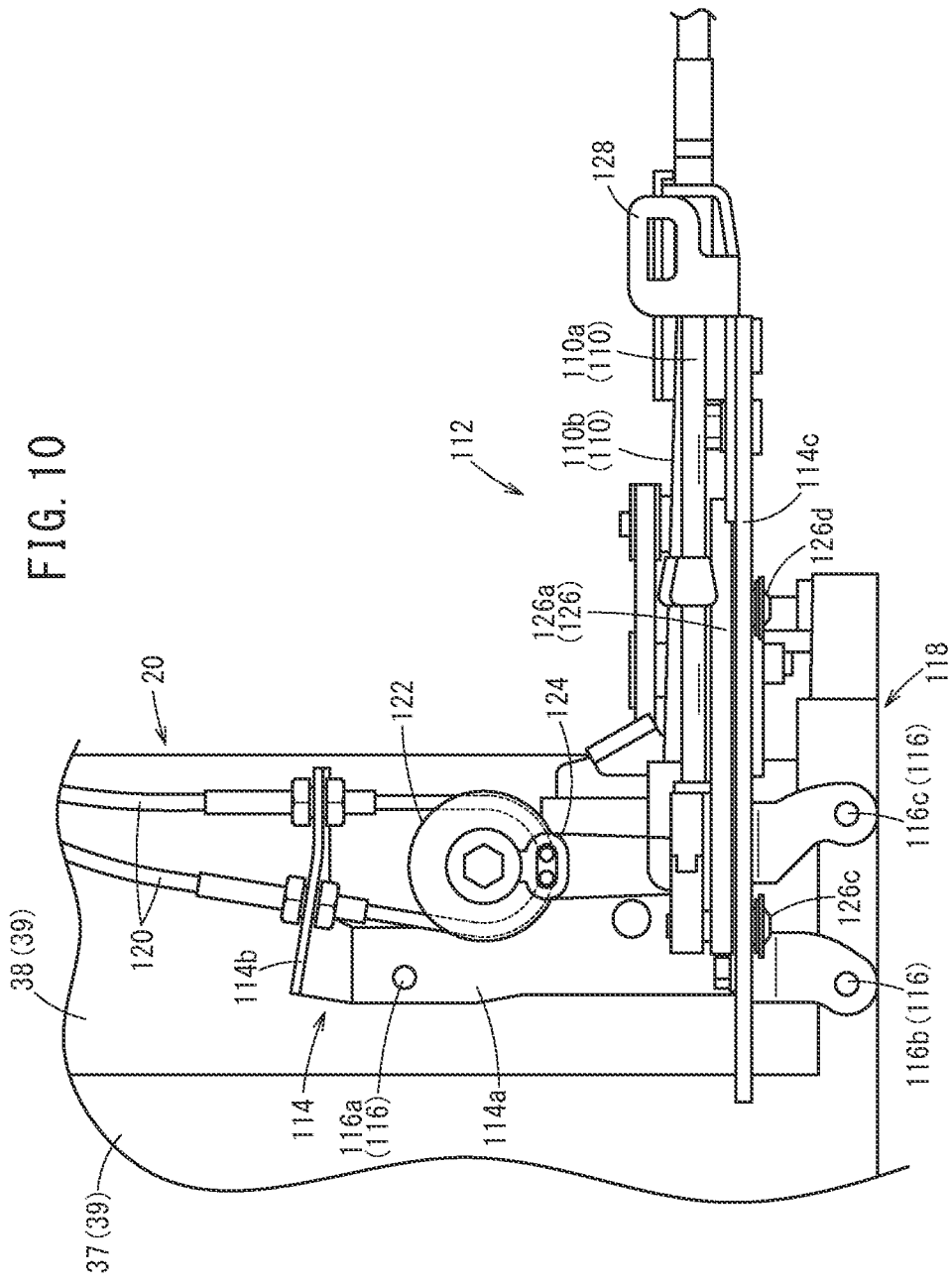

SHIFT MECHANISM OF OUTBOARD MOTOR, AND MOUNT STRUCTURE OF SHIFT MECHANISM

TECHNICAL FIELD

The present invention relates to a shift mechanism of an outboard motor for shifting a transmission by an electric actuator, and a mount structure of the shift mechanism for mounting the shift mechanism.

BACKGROUND ART

In an outboard motor, shifting (shift switching) of a transmission is performed by a shifting operation by a vessel operator. When a shift mechanism provided with a mechanical cable is used, a good operational feeling can be obtained, but there is a disadvantage such as requiring a long cable. In recent years, a shift mechanism (DBW: Drive By Wire) using an electric actuator has also been developed. For example, JP 2006-062478 A discloses an outboard motor in which an electric actuator is directly connected to a shift rod (operation shaft). Such a shift mechanism is capable of more precise control in, for example, shift switching, throttle control, and the connection thereof than a conventional cable-type shift mechanism.

SUMMARY OF THE INVENTION

Incidentally, when a shift mechanism having an electric actuator is employed, the number of components increases compared to a cable-type shift mechanism, and it is necessary to arrange large components such as the electric actuator. How to lay out the components in a limited space of an outboard motor is an extremely important factor for the outboard motor that is desired to be miniaturized. Further, in consideration of maintenance of the shift mechanism and emergency such as failure of the shift mechanism, it is required that the shift mechanism is disposed at a position where work is easy so that shift switching by manual operation of a vessel operator can be easily performed.

Further, with a mount structure of an outboard motor to which both an electric actuator-type shift mechanism and a cable-type shift mechanism can be applied without changing the arrangement of the engine, it is possible to reduce the manufacturing cost while increasing the variety of outboard motors of the same model.

The present invention relates to a technology of the above-described outboard motor. It is an object of the present invention to provide a shift mechanism of an outboard motor and a mount structure of the shift mechanism capable of promoting further miniaturization and facilitating work such as maintenance.

In order to achieve the above object, a shift mechanism of an outboard motor according to a first aspect of the present invention comprises: an electric actuator configured to cause a movable portion to make linear motion; a guide structure that includes a sliding body connected to the movable portion and is configured to guide linear motion of the sliding body; a link rod connected to the sliding body, and bent and extending in a direction different from a direction of the linear motion of the sliding body; and a shift shaft portion connected to the link rod, and configured to make rotational motion based on displacement of the link rod and switch between forward movement and backward movement based on the rotational motion.

Further, in order to achieve the above object, according to a second aspect of the present invention, there is provided a mount structure of a shift mechanism including provided at a position near an engine in which a piston and a crankshaft are housed in an engine body, wherein one of an actuator bracket or a cable bracket is allowed to be selectively fixed to the engine body, the actuator bracket being configured to hold an electric actuator configured to cause a movable portion to make linear motion, and the cable bracket being configured to hold a cable shift mechanism configured to convert forward and backward motion of a cable into rotational motion, the cable bracket is fixed to a crankcase of the engine body, and the actuator bracket is fixed across a cylinder block and the crankcase above the cable bracket.

The shift mechanism of the outboard motor and the mount structure of the shift mechanism described above can promote further miniaturization and facilitate work such as maintenance.

BRIEF DESCRIPTION OF DRAWINGS

FIG. 10 is a side view showing a state in which a cable bracket is attached to the engine body.

DESCRIPTION OF THE INVENTION

A preferred embodiment of the present invention will be presented and described in detail below with reference to the accompanying drawings.

Figure 1:
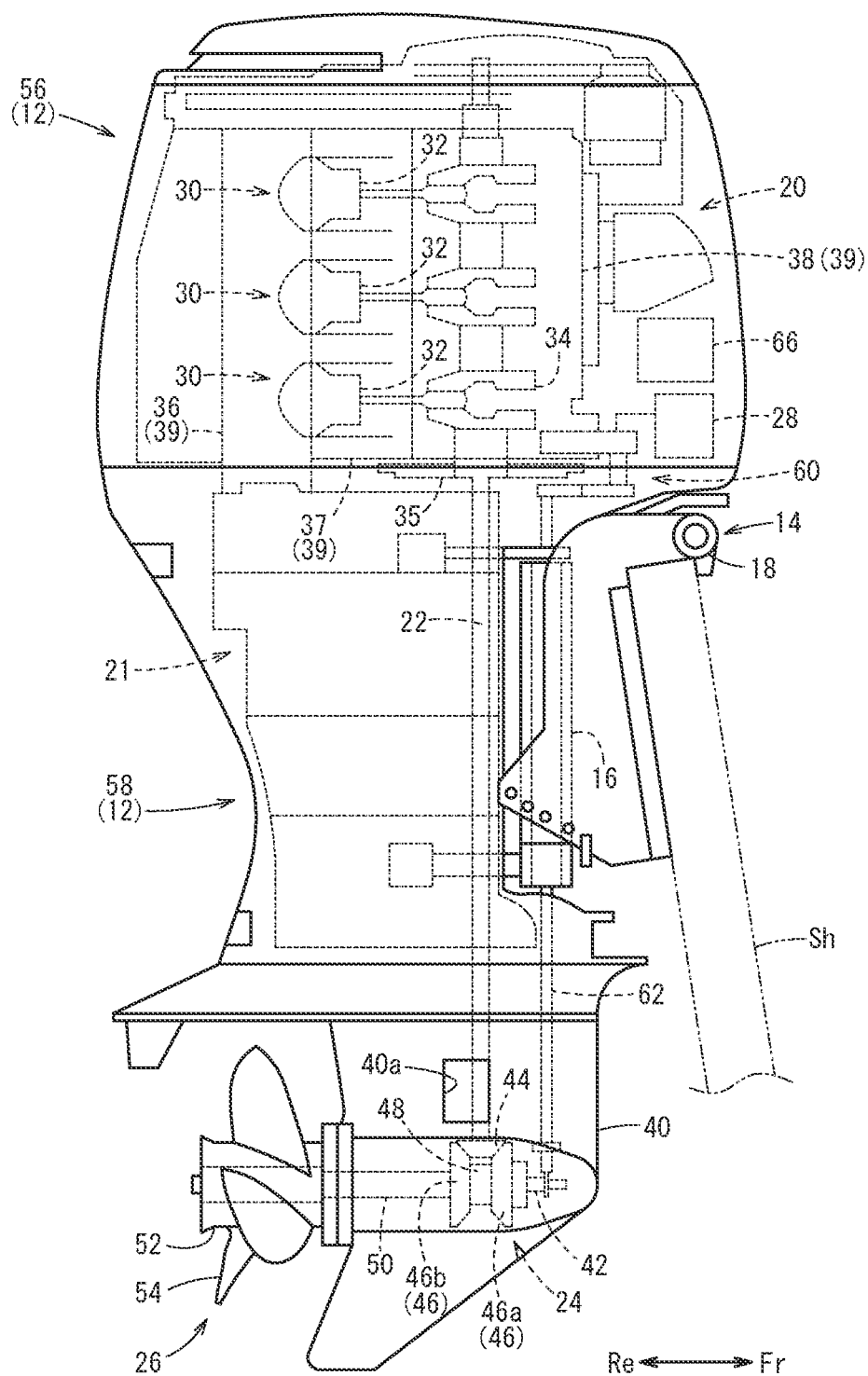
FIG. 1 is a side view showing an overall configuration of an outboard motor according to an embodiment of the present invention.

As shown in FIG. 1, an outboard motor 10 according to the present embodiment is attached to a hull Sh as a power source of a small vessel or the like, and is driven based on an operation of a vessel operator (user) to propel the hull Sh. The outboard motor 10 includes a cover 12 that houses respective components of the outboard motor 10, and an attachment mechanism 14 that fixes the outboard motor 10 to the hull Sh on a front side of the cover 12.

The attachment mechanism 14 allows the outboard motor 10 to swing left and right about a swivel shaft 16 in plan view, and allows the cover 12 to rotate clockwise or counterclockwise in FIG. 1 about a tilt shaft 18. In the outboard motor 10, in a state in which the up-down direction of the cover 12 extends substantially in the vertical direction, a propeller (with fins 54) is positioned below the water surface.

An engine 20 (internal combustion engine), a drive shaft 22, a transmission mechanism 24, a propeller mechanism 26, and a control device 28 are housed in the cover 12. Further, the outboard motor 10 includes, on a lower side of the engine 20, an exhaust system (not shown) that causes exhaust gas from the engine 20 to flow, and a cooling structure 21 that cools the engine 20 and the exhaust gas.

The engine 20 is a multi-cylinder engine (for example, a V-type engine) provided with a plurality of cylinders 30 along the up-down direction (vertical direction) of the outboard motor 10. In the engine 20, the axis line of each cylinder 30 is disposed laterally (substantially horizontally), and a crankshaft 34 coupled to a connecting rod 32 of each cylinder 30 extends in the up-down direction.

The engine 20 includes an engine body 39 that houses the connecting rods 32 and the crankshaft 34. The engine body 39 is a structural portion that does not include auxiliary devices such as an intake system and the exhaust system of the engine 20, and is configured by mutually assembling a cylinder head 36, a cylinder block 37, and a crankcase 38. The cylinder head 36 and the cylinder block 37 are each provided with a cooling water jacket (not shown) for cooling the engine 20.

A flywheel 35 is coupled to a lower end portion of the crankshaft 34 of the engine 20. The flywheel 35 is disposed below the cylinder block 37 and the crankcase 38 of the engine 20. The drive shaft 22 extends in the up-down direction inside the cover 12 and is rotatable about its axis. A lower end of the drive shaft 22 is housed in the transmission mechanism 24.

Rotational motion is transmitted from a shift mechanism 60 provided at a position near the engine 20 to the transmission mechanism 24 via an operation shaft 62. The transmission mechanism 24 shifts (performs shift switching of) a rotational output of the engine 20 based on the rotation of the operation shaft 62. In the present specification, "shift" is an expression including switching of the traveling direction (forward, neutral, reverse) of the hull Sh.

Specifically, the transmission mechanism 24 moves a shift slider 42 forward and backward along the axial direction of the propeller mechanism 26 (propeller shaft 50) based on the rotation of the operation shaft 62. Accordingly, the shift slider 42 moves a dog clutch 48 between a pair of driven bevel gears 46 (a forward driven bevel gear 46a and a backward driven bevel gear 46b) that mesh with a drive bevel gear 44 coupled to the drive shaft 22. A tooth surface of the dog clutch 48 that has moved engages with one of an inner tooth surface of the forward driven bevel gear 46a or an inner tooth surface of the backward driven bevel gear 46b. Thus, the driving force of the engine 20 is transmitted to the propeller mechanism 26 via the dog clutch 48 and the propeller shaft 50 described later.

The propeller mechanism 26 includes the propeller shaft 50 with a tubular shape into which the shift slider 42 is inserted, a tubular body 52 coupled to a radially outer side of the propeller shaft 50, and the plurality of fins 54 coupled to an outer peripheral surface of the tubular body 52. The propeller mechanism 26 rotates the respective fins 54 clockwise or counterclockwise about the propeller shaft 50 which rotates via the transmission mechanism 24, thereby moving hull Sh forward or backward.

The cover 12 of the outboard motor 10 includes an upper cover 56 that mainly covers the engine 20 located in an upper portion of the outboard motor 10, and a lower cover 58 that covers the components below the engine 20. The upper cover 56 and the lower cover 58 are fixed to, for example, a mount frame (not shown) for mounting the engine 20.

The upper cover 56 has a housing space that covers the engine 20. The upper cover 56 is formed into a recessed box with its lower portion open. Further, for the purpose of maintenance of the engine 20 and the shift mechanism 60, the upper cover 56 can be detached from the engine 20 by a detaching operation by the user. Note that the upper cover 56 may be dividable into a plurality of parts in order to improve handleability during maintenance.

The engine 20 and the cooling structure 21 are of a water-cooling type in which the engine 20 is cooled by supplying, to the engine 20, water such as seawater or fresh water taken from a water intake port 40a of a gear case 40. Water that has been used for cooling the engine 20 or the like is mixed with exhaust gas and discharged to the outside of the cover 12 through a through hole in the tubular body 52.

Figure 2:
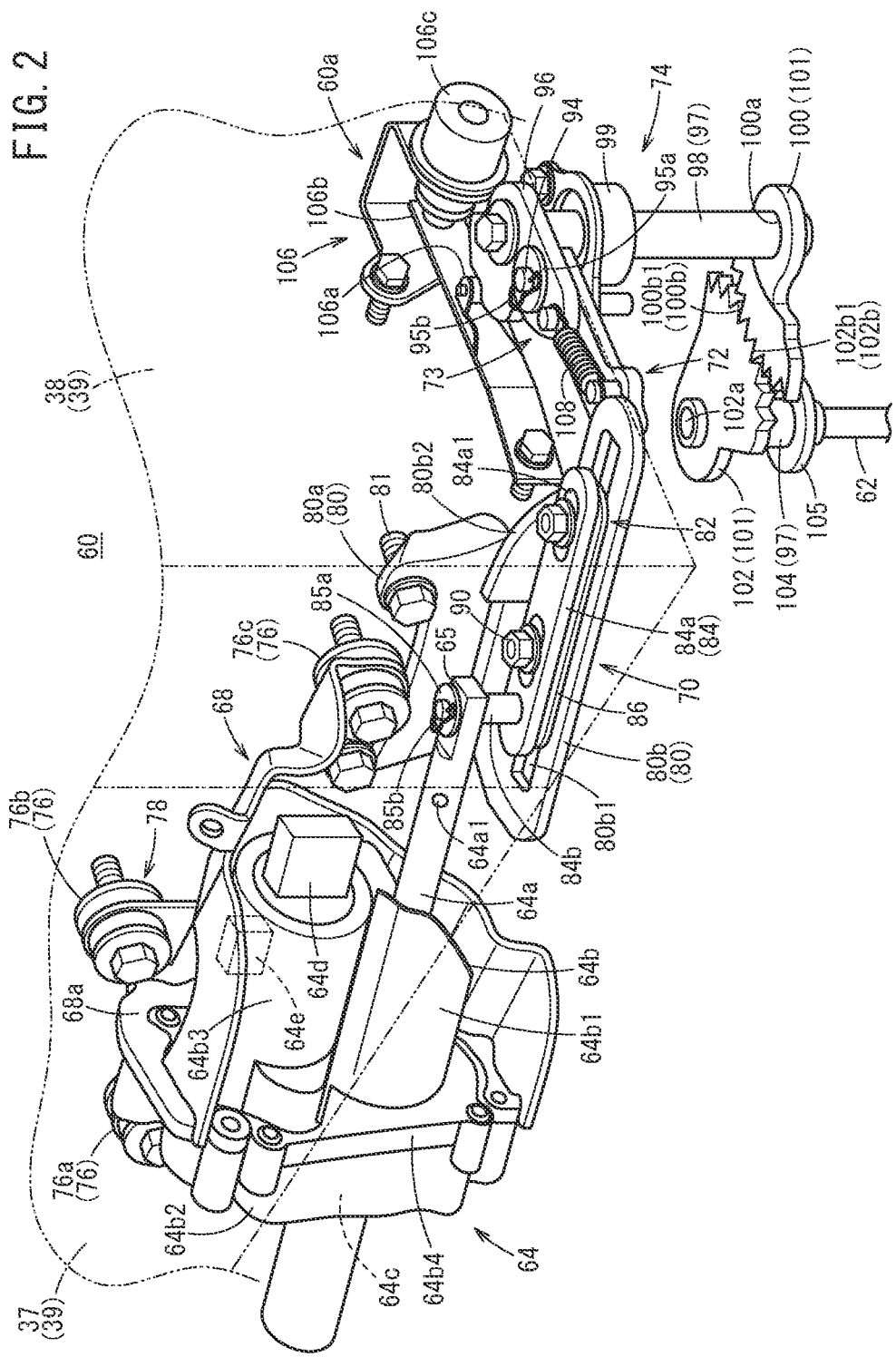
FIG. 2 is a perspective view showing a shift mechanism of an electric actuator.

Next, the shift mechanism 60 of the outboard motor 10 according to the present embodiment will be described in detail. As shown in FIG. 2, a main mechanism portion of the shift mechanism 60 is fixed to a side and front portion of the engine 20 of the outboard motor 10. In the shift mechanism 60, portions requiring maintenance (for example, an electric actuator 64 and a guide body 80 described later) are provided above the flywheel 35. Therefore, when the user removes the upper cover 56 (see FIG. 1) for maintenance, the portion that requires maintenance is easily exposed together with the engine 20.

The shift mechanism 60 includes the electric actuator 64 (hereinafter, also simply referred to as the actuator 64) that receives, without using a cable 110 described later, an operation signal of an operating portion (not shown) operated by the user, and rotates the operation shaft 62. That is, the control device 28 supplies appropriate electric power from a battery 66 (see FIG. 1) to the actuator 64 based on an operation signal such as an electric signal or a wireless signal, and causes a movable rod 64a (movable portion) of the actuator 64 to make linear motion. The shift mechanism 60 rotates the operation shaft 62 by converting the linear motion into rotational motion.

Specifically, the shift mechanism 60 includes, in addition to the actuator 64, an actuator bracket 68 that fixes the actuator 64, a guide structure 70 that guides linear motion, and a link rod 72 and a shift shaft portion 74 that convert linear motion into rotational motion.

The actuator 64 includes the movable rod 64a described above, a housing 64b that houses the movable rod 64a in a manner that the movable rod 64a is able to advance and retreat, and a drive mechanism 64c that is provided inside the housing 64b and moves the movable rod 64a.

The movable rod 64a is formed in a rod shape extending linearly with a constant thickness. A proximal end portion of the movable rod 64a is housed in the housing 64b. A distal end portion (extending end) of the movable rod 64a is exposed from the housing 64b and connected to the guide structure 70. A pair of flat surfaces 65 are formed at the distal end portion of the movable rod 64a by cutting out the upper and lower outer peripheral surfaces thereof. A coupling hole portion 65a (see FIG. 6) is formed so as to penetrate the pair of flat surfaces 65.

Further, a through hole 64a1 that penetrates an outer peripheral surface of the movable rod 64a in the radial direction is provided in the vicinity of the distal end portion of the movable rod 64a. The through hole 64a1 constitutes a manually operated portion that allows the movable rod 64a to advance and retreat manually by the user in an emergency such as when the actuator 64 does not operate.

The housing 64b includes a first tubular portion 64b1 that houses the movable rod 64a in a manner that the movable rod 64a is able to advance and retreat, a mechanism housing portion 64b2 provided at a proximal end of the first tubular portion 64b1, and a second tubular portion 64b3 that is continuous with the side of the first tubular portion 64b1 and includes a connector 64d connected to electrical wiring. Further, a fixing flange 64b4 fixed to the actuator bracket 68 is provided at a predetermined axial position of the housing 64b. Furthermore, a sensor 64e for detecting the movement position of the movable rod 64a is attached to the second tubular portion 64b3.

The drive mechanism 64c is formed of, for example, a motor and a ball screw mechanism that converts rotation of the motor into linear motion of the movable rod 64a (both not shown). The drive mechanism 64c moves the movable rod 64a in a direction toward the distal end based on an advance command from the control device 28, and moves the movable rod 64a in a direction toward the proximal end based on a retreat command. By the driving of the drive mechanism 64c, the position of the movable rod 64a is basically switched to a first position at which the movable rod 64a arrives after moving most in the direction toward the distal end, a second position in the middle of the movement stroke, and a third position at which the movable rod 64a arrives after moving most in the direction toward the proximal end.

The actuator bracket 68 is formed into an appropriate shape by bending a plate member along an outer periphery of the housing 64b of the actuator 64, and holds the upper and lower surfaces and one side surface of the actuator 64. The actuator bracket 68 is formed with an attached body 68a protruding from the plate member surrounding the actuator 64. The fixing flange 64b4 is fastened to the attached body 68a. The actuator 64 is fixed by the actuator bracket 68 to one side surface of the engine body 39 such that the extending direction (direction of linear motion) of the movable rod 64a is oblique to the side surface.

Figure 3:
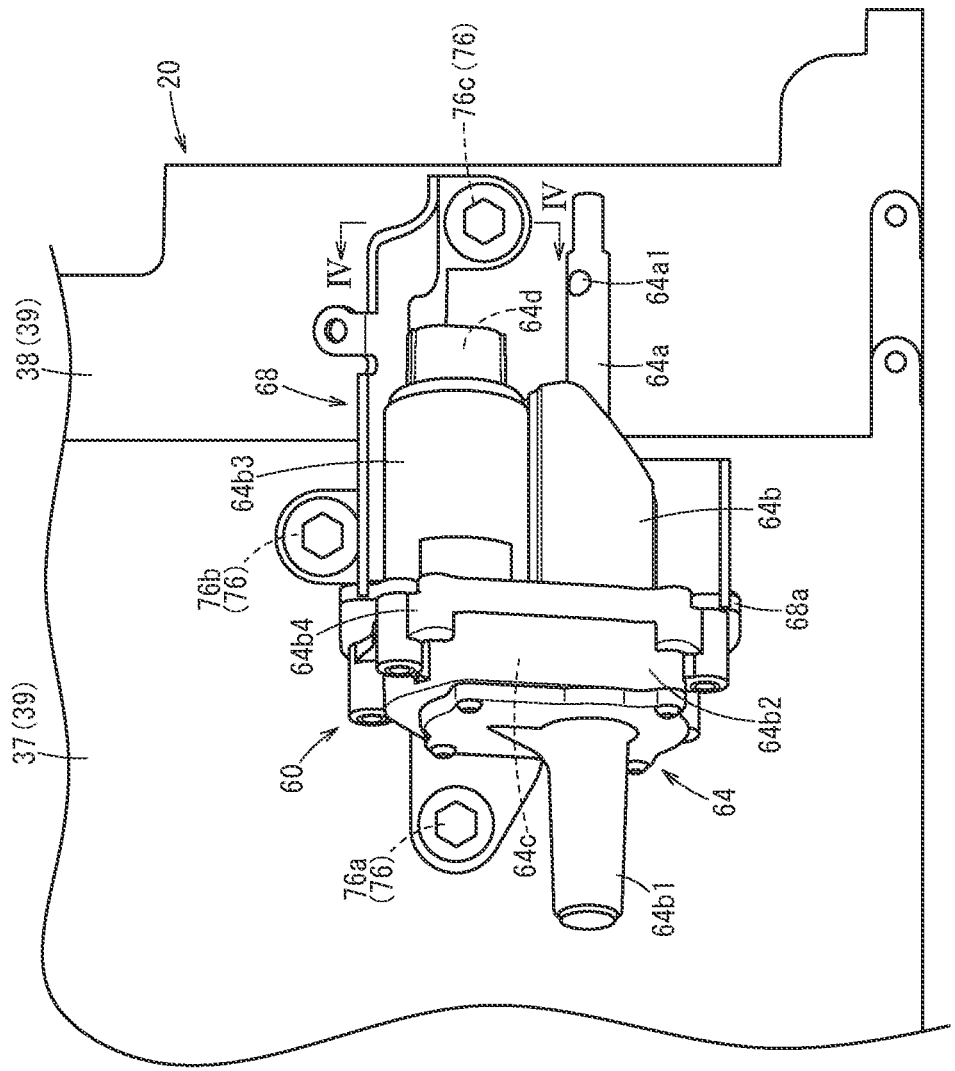
FIG. 3 is a side view showing a state in which an actuator bracket is attached to an engine body.

As shown in FIG. 3, the actuator bracket 68 is fixed to an actuator mounting portion 76 (three fastening sections 76a to 76c) provided at lower front portions of the engine body 39. Specifically, the actuator mounting portion 76 is provided slightly above a lower end of the upper cover 56. The actuator 64 held by the actuator bracket 68 is also positioned above the lower end of the upper cover 56. Further, the actuator mounting portion 76 includes two fastening sections 76a and 76b on the cylinder block 37, and one fastening section 76c on the crankcase 38.

Figure 4:
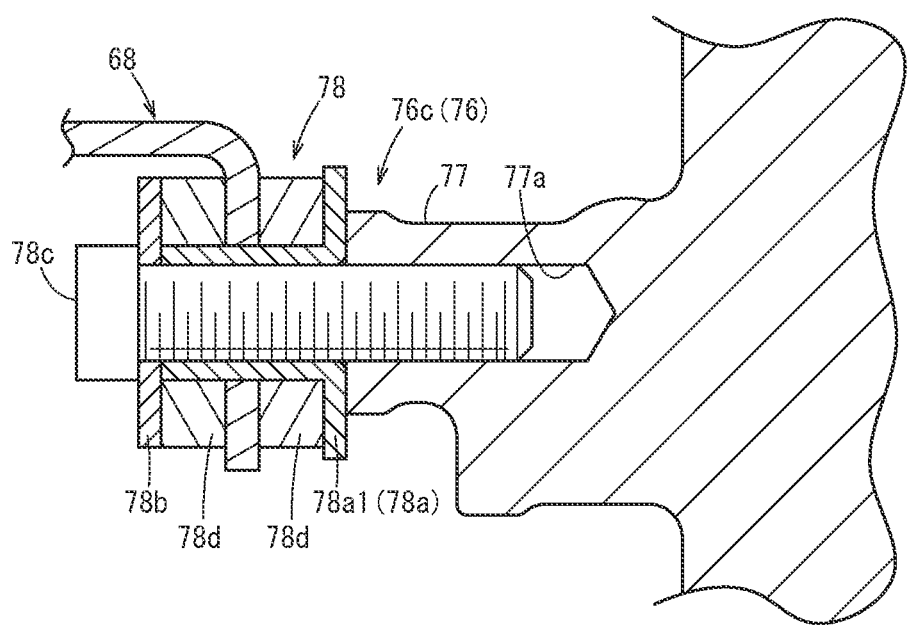
FIG. 4 is a cross-sectional view taken along line IV-IV of FIG. 3.

As shown in FIG. 4, each of the fastening sections 76a to 76c is formed with a fastening protruding portion 77 protruding from the cylinder block 37 or the crankcase 38 and having, inside thereof, a female screw portion 77a. The actuator bracket 68 is fixed to the fastening protruding portion 77 (fastening section 76a, 76c) via a fixing structure 78 formed of a plurality of members.

The fixing structure 78 includes a cylindrical collar 78a disposed on the fastening protruding portion 77, a ring-shaped washer 78b disposed on a protruding end of the collar 78a, and a fixing bolt 78c screwed into the female screw portion 77a through the collar 78a and the washer 78b. Further, the fixing structure 78 includes a pair of ring-shaped elastic members 78d on an outer peripheral surface of the collar 78a. The pair of elastic members 78d are disposed between a flange 78a1 of the collar 78a and the washer 78b, and sandwich the actuator bracket 68 therebetween. With the pair of elastic members 78d, transmission of vibration applied to the actuator bracket 68 in the lateral direction from the engine 20 is suppressed.

Returning to FIG. 2, the linear motion of the movable rod 64a of the actuator 64 is guided by the guide structure 70 connected to the distal end portion of the movable rod 64a. The guide structure 70 includes the guide body 80 fixed to the engine body 39, and a sliding body 82 coupling between the movable rod 64a and the link rod 72 and guided by the guide body 80.

The guide body 80 includes a fixed plate portion 80a fixed to the engine body 39, and a guide plate portion 80b connected to a lower portion of the fixed plate portion 80a and extending on the lateral side of the engine 20 (in the horizontal direction). The guide plate portion 80b is provided with a guide opening 80b1 for guiding the sliding direction of the sliding body 82.

Figure 5:
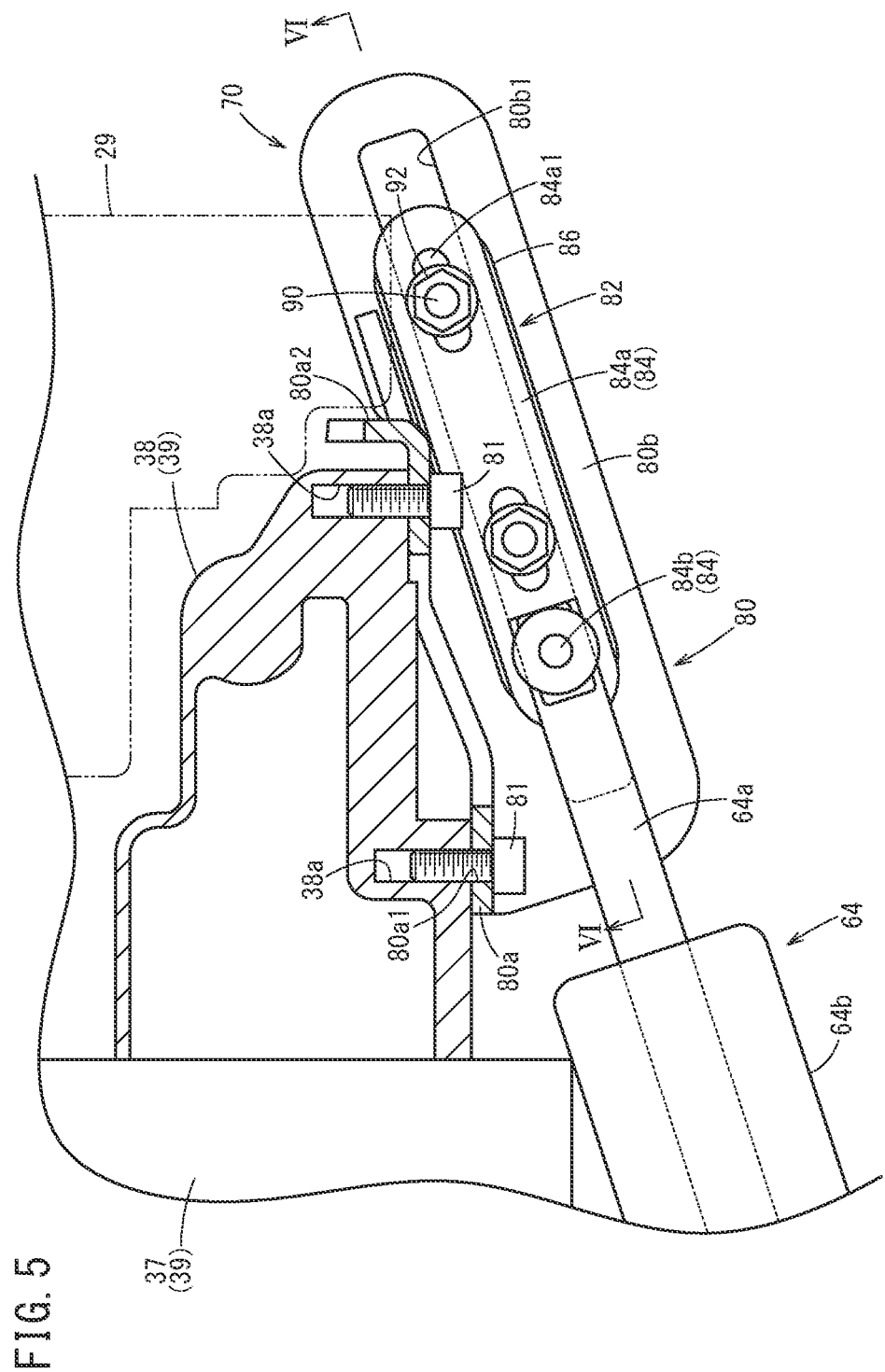
FIG. 5 is a partial plan cross-sectional view showing a state in which a guide structure is attached to the engine body.

In the crankcase 38, the fixed plate portion 80a is fixed below and forward of the fastening sections 76a to 76c. As shown in FIG. 5, the fixed plate portion 80a is provided with a plurality of (two) attachment holes 80a1. A bolt 81 is inserted into each of the attachment holes 80a1. By fastening the bolt 81 to a screw hole 38a of the crankcase 38, the guide body 80 is firmly fixed. The crankcase 38 forms a step that is bent inward toward the front. In order for the guide body 80 to be attached to the plurality of screw holes 38a provided in the step, the guide body 80 is inclined such that the positions of the two attachment holes 80a1 are shifted in a planar cross-sectional view.

Further, a bent portion 80a2 that is bent so as to overlap the front side of the crankcase 38 and reinforces the fixed plate portion 80a is provided at a front portion of the guide body 80. The bent portion 80a2 is configured to enter between the crankcase 38 and an electrical equipment case 29 that houses the control device 28 and the like.

The guide plate portion 80b of the guide body 80 is formed into a long flat plate along the extending direction of the guide opening 80b1. Further, a reinforcing portion 80b2 formed by erecting the flat plate in order to reinforce the extending posture of the guide plate portion 80b is provided at an intermediate position in the extending direction of the guide plate portion 80b.

The guide plate portion 80b is fixed by the fixed plate portion 80a to the side surface of the crankcase 38 so as to be inclined with respect to the side surface in plan view. The guide opening 80b1 extends parallel to the extending direction of the movable rod 64a of the actuator 64 in a state in which the guide body 80 is fixed.

Figure 6:
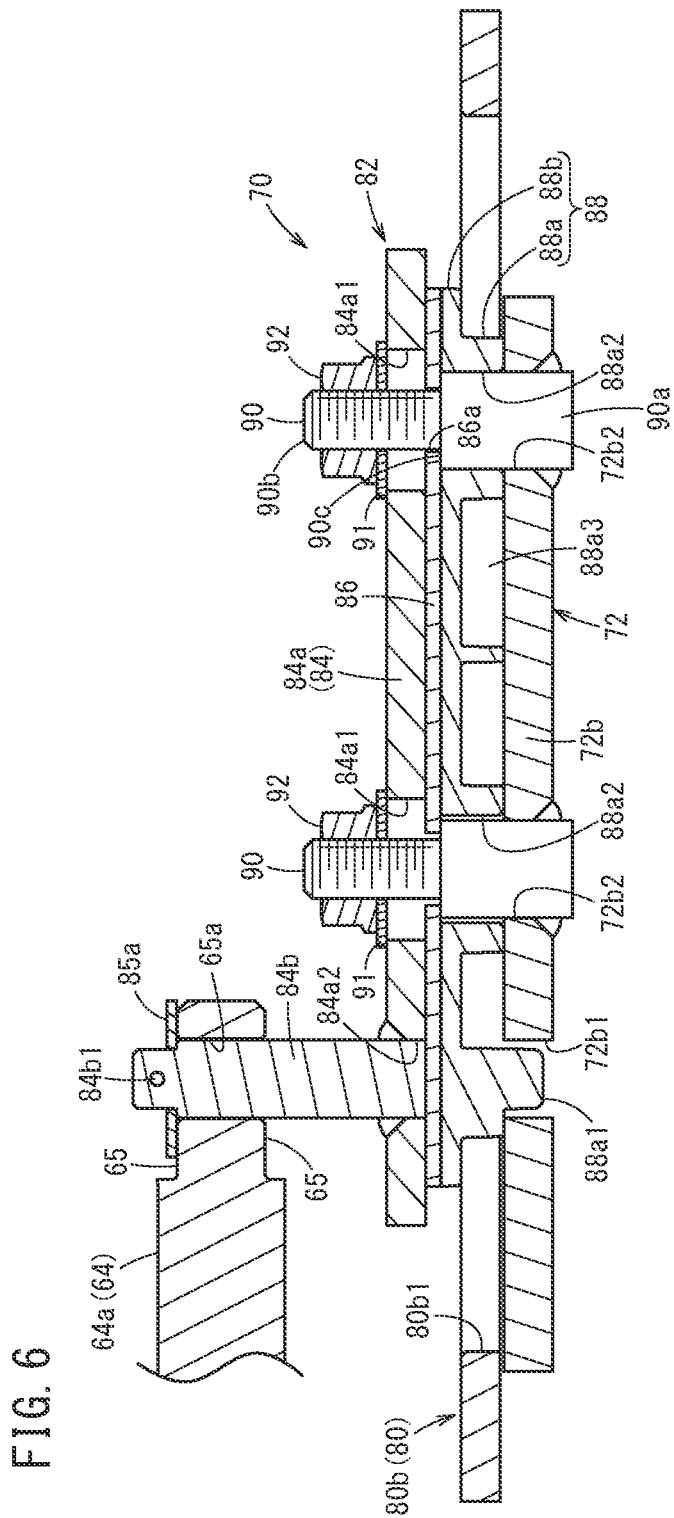
FIG. 6 is a cross-sectional view taken along line VI-VI of FIG. 5.

Meanwhile, as shown in FIGS. 2 and 6, the sliding body 82 of the guide structure 70 is formed by fastening a plurality of members (the link rod 72, a coupling member 84, a pivot plate 86, and a shift pivot 88) with connecting bolts 90. The sliding body 82 slides relative to the guide plate portion 80b having the guide opening 80b1.

The coupling member 84 includes a long plate 84a having a predetermined thickness, and a coupling bar 84b protruding upward from a proximal end portion of the long plate 84a. A plurality of (two) long holes 84a1 into which the connecting bolts 90 are inserted are provided on a front side of the coupling portion between the long plate 84a and the coupling bar 84b. The long holes 84a1 each extend along the longitudinal direction of the long plate 84a, and enable positional adjustment of other members (the link rod 72, the pivot plate 86, and the shift pivot 88) coupled by the connecting bolts 90.

The coupling bar 84b is inserted into an insertion hole 84a2 of the long plate 84a, and is firmly fixed to the long plate 84a by a fixing method such as welding or bonding. An upper portion of the coupling bar 84b is inserted into the coupling hole portion 65a of the movable rod 64a of the actuator 64. A washer 85a is mounted on an upper end portion of the coupling bar 84b that is exposed from the movable rod 64a, and a fixing pin 85b is inserted into a hole portion 84b1 formed to penetrate in the radial direction. As a result, the movable rod 64a and the coupling member 84 are connected so as to be rotatable relative to each other, and the sliding body 82 makes linear motion based on the movement of the movable rod 64a.

The pivot plate 86 is fixed to a surface of the coupling member 84 opposite to the protruding direction of the coupling bar 84b. The pivot plate 86 includes a plurality of (two) round holes 86a allowing the connecting bolts 90 to pass therethrough.

The shift pivot 88 is disposed between the link rod 72 and the pivot plate 86, and is disposed in the guide opening 80b1 of the guide body 80 to constitute a portion that slides relative to the guide body 80. An arranged portion 88a of the shift pivot 88 that is arranged in the guide opening 80b1 has a substantially rectangular shape shorter than the longitudinal length of the guide opening 80b1 in plan view. A convex portion 88a1 to be inserted into a hole portion 72b1 of the link rod 72 is provided at a proximal end portion of the arranged portion 88a. In the arranged portion 88a, a plurality of arrangement holes 88a2 in which large-diameter portions of the connecting bolts 90 are arranged are formed to penetrate the arranged portion 88a. Further, in order to reduce weight, the arranged portion 88a includes a plurality of cavities 88a3 which are cut out in the thickness direction from the surface facing the link rod 72.

On the pivot plate 86 side of the shift pivot 88, a flat portion 88b that is larger in the longitudinal direction and the lateral direction (width direction) than the arranged portion 88a is provided. The flat portion 88b has a larger width than the width of the guide opening 80b1 and is disposed on an upper surface of the guide plate portion 80b. The planar shape of the flat portion 88b and the planar shape of the pivot plate 86 substantially match each other.

One end portion of the connecting bolt 90 is firmly fixed to the link rod 72 by a fixing method such as welding or bonding, and the other end portion thereof is screwed into a connecting nut 92 via a washer 91. The connecting bolt 90 includes a large-diameter portion 90a fixed to the link rod 72, and a small-diameter portion 90b protruding from a protruding end of the large-diameter portion 90a and formed thinner than the large-diameter portion 90a. A male screw is formed near a protruding end of the small-diameter portion 90b.

The large-diameter portion 90a is positioned in an arrangement hole 88a2 of the shift pivot 88. The small-diameter portion 90b is inserted through the round hole 86a of the pivot plate 86 and the long hole 84a1 of the coupling member 84, and passes through the washer 91, and the connecting nut 92 is screwed onto the small-diameter portion 90b. A step 90c is formed at the boundary between the large-diameter portion 90a and the small-diameter portion 90b, and the pivot plate 86 is caught by the step 90c. That is, the connecting bolt 90 and the connecting nut 92 fasten the coupling member 84 between the pivot plate 86 and the washer 91 with a strong fastening force.

The long hole 84a1 of the coupling member 84 enables adjustment of connection of the link rod 72, the pivot plate 86, and the shift pivot 88 with the coupling member 84 during fastening of the connecting bolt 90 and the connecting nut 92. Accordingly, the shift mechanism 60 can appropriately set the position and the movement range of the link rod 72 relative to the movable rod 64a.

Figure 7:
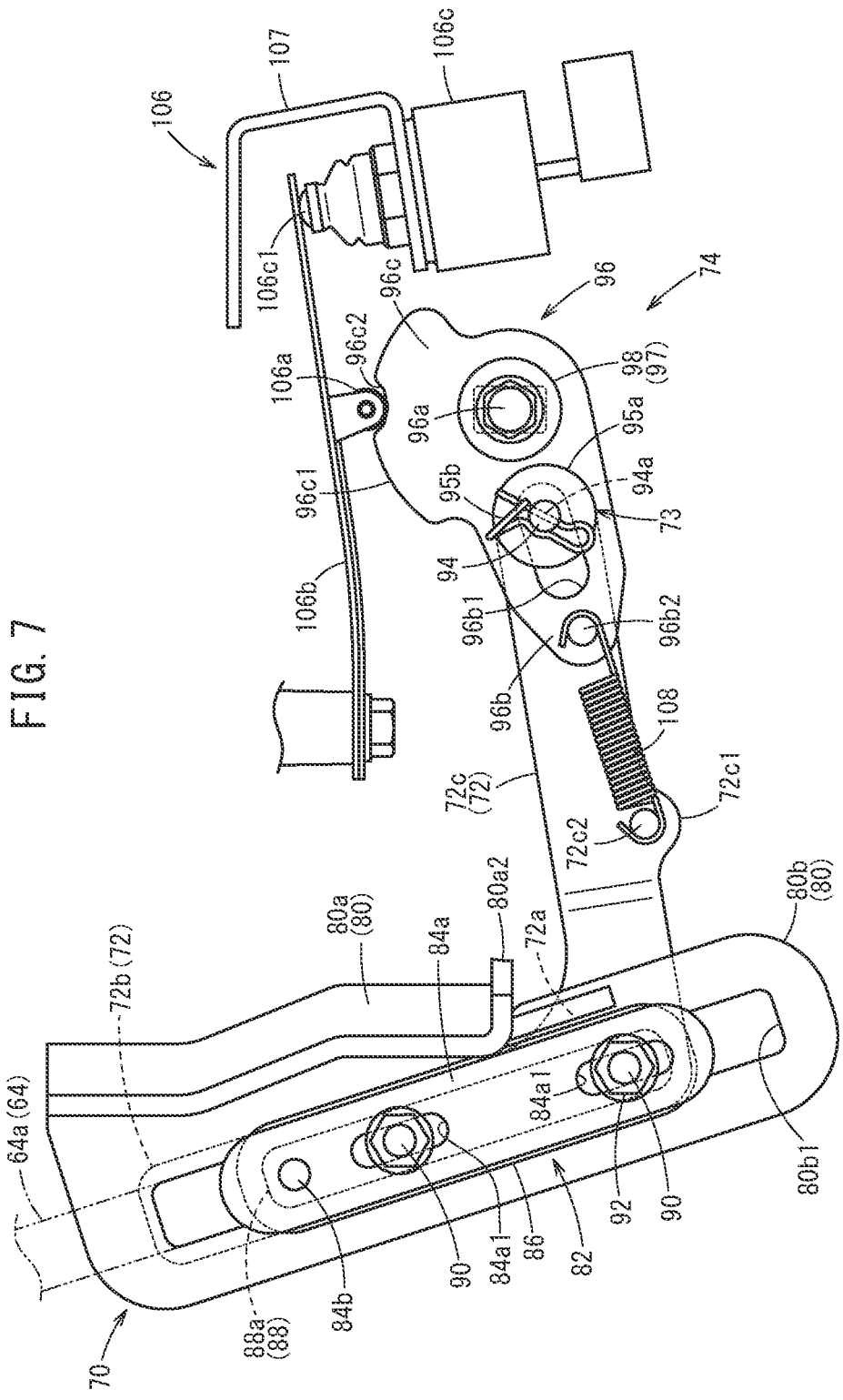
FIG. 7 is a plan view showing the guide structure, a link rod, and a shift shaft portion.

As shown in FIGS. 2 and 7, the link rod 72 is formed in a substantially V shape in plan view and includes, via a base point 72a, a fixed portion 72b that extends in a first direction and is fixed to the sliding body 82 of the guide structure 70, and an extending portion 72c that extends in a second direction and extends in the lateral direction of the guide structure 70. An inclination angle between the fixed portion 72b and the extending portion 72c is not particularly limited, but is set in a range of 90° to 120°, for example.

The fixed portion 72b is formed in a block shape having a predetermined thickness, and extends in the same direction as the sliding body 82 of the guide structure 70. In order to be coupled to the sliding body 82, the fixed portion 72b includes the hole portion 72b1 into which the convex portion 88a1 of the shift pivot 88 is inserted, and a plurality of fixing holes 72b2 into which the connecting bolts 90 are inserted and fixed.

The extending portion 72c is formed in a block shape having the same thickness as the fixed portion 72b. The extending portion 72c is inclined obliquely downward in the vicinity of the coupling portion with the base point 72a, and extends in the second direction at a position lower than the height at which the fixed portion 72b extends. The extending portion 72c moves along the first direction without changing the extending posture thereof, in accordance with the movement of the fixed portion 72b along the first direction.

A link pin 94 is coupled to an extending end of the extending portion 72c, and a shift arm 96 of the shift shaft portion 74 is connected via the link pin 94. The extending portion 72c and the link pin 94 are coupled to each other, for example, by a fixing method similar to that for the fixed portion 72b and the connecting bolt 90. A washer 95a is mounted on an upper portion of the link pin 94 that is exposed from the shift arm 96, and a fixing pin 95b is inserted into a hole portion 94a formed to penetrate in the radial direction. A protruding portion 72c1 that protrudes short in the forward direction is provided at an intermediate position of the extending portion 72c in the extending direction thereof. An attachment projection 72c2 to which one end of a spring 108 (elastic body) is attached is formed on the protruding portion 72c1.

On the other hand, the shift shaft portion 74 makes rotational motion based on the displacement of the link rod 72, and transmits the rotational motion to the operation shaft 62. The shift shaft portion 74 includes the shift arm 96, a first shift shaft 98, a first gear 100, a second gear 102, a second shift shaft 104, and a neutral detecting unit 106.

The shift arm 96 is formed in a plate shape having a predetermined thickness and includes a rotation center portion 96a coupled to the first shift shaft 98. The shift arm 96 includes a link extending portion 96b that extends in a direction in which the link rod 72 is installed (the second direction of the extending portion 72c), and a neutral cam portion 96c that extends in a direction (a direction toward the engine body 39) different from the direction of link extending portion 96b, the link extending portion 96b and the neutral cam portion 96c extending from the rotation center portion 96a.

The link extending portion 96b includes a link hole portion 96b1 penetrating through the upper and lower surfaces of the shift arm 96. The link hole portion 96b1 is formed as a long hole extending along the extending direction of the link extending portion 96b, and the link pin 94 is movably inserted into the link hole portion 96b1. That is, the linear motion of the link rod 72 is converted into the rotational motion of the shift arm 96 by a link connection structure 73 including the link hole portion 96$b$1 and the link pin 94.

For example, when the transmission mechanism 24 is in the neutral position, the link pin 94 is positioned in the link hole portion 96$b$1 closer to the proximal end portion (the rotation center portion 96$a$). When the extending portion 72$c$ of the link rod 72 moves forward or backward, the link pin 94 moves inside the link hole portion 96$b$1 toward the distal end portion (extending end portion) side. Along with this movement, the shift arm 96 rotates clockwise or counterclockwise in FIG. 7 about the rotation center portion 96$a$.

An attachment projection 96$b$2 to which the other end of the spring 108 is coupled is provided at an extending end of the link extending portion 96$b$. The spring 108 is provided between the attachment projection 72$c$2 and the attachment projection 96$b$2, and applies an appropriate tension between the link rod 72 and the shift arm 96.

The neutral cam portion 96$c$ is formed in a substantially circular arc shape at a position separated from the rotation center portion 96$a$ by a predetermined radius. An outer edge 96$c$1 of the neutral cam portion 96$c$ constitutes a portion with which a contact 106$a$ of the neutral detecting unit 106 comes into contact. Further, the outer edge 96$c$1 is provided with a recess 96$c$2 into which the contact 106$a$ is inserted.

The neutral detecting unit 106 according to the present embodiment is configured to include the contact 106$a$, an elastic plate 106$b$ for elastically supporting the contact 106$a$, and a switch sensor 106$c$ disposed at the other end of the elastic plate 106$b$.

Figure 8A:
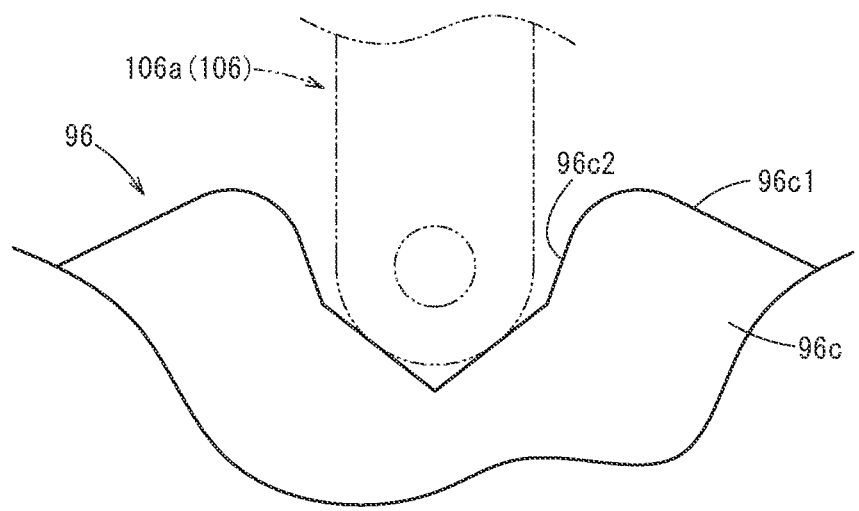
FIG. 8A is an enlarged plan view showing a recess of a shift arm of the electric actuator.

As shown in FIG. 8A, the contact 106$a$ protrudes from a substantially middle position of the elastic plate 106$b$ in the extending direction, and includes a rollable roller at the protruding end thereof. Correspondingly, the recess 96$c$2 of the shift arm 96 is recessed from the outer edge 96$c$1 toward the rotation center portion 96$a$, and is formed in a polygonal shape in plan view. More specifically, the recess 96$c$2 has an obtuse valley part at the innermost portion closest to the rotation center portion 96$a$. The recess 96$c$2 has a pair of corner portions that are bent outward from a pair of lines each connecting the valley part and a boundary between the recess 96$c$2 and the outer edge 96$c$1. The recess 96$c$2 formed in this manner can positively guide the contact 106$a$ from the outer edge 96$c$1 toward the valley part of the recess 96$c$2 when the shift arm 96 rotates.

As shown in FIGS. 2 and 7, one end of the elastic plate 106$b$ of the neutral detecting unit 106 is screwed to the engine body 39 (front portion of the crankcase 38). The other end of the elastic plate 106$b$ is a free end, and its position varies depending on whether the contact 106$a$ is located on the outer edge 96$c$1 of the shift arm 96 or in the recess 96$c$2.

The switch sensor 106$c$ is held by a frame 107 fixed to the engine body 39, and includes a detection portion 106$c$1 at a position facing the other end of the elastic plate 106$b$. When the contact 106$a$ is located on the outer edge 96$c$1, the other end of the elastic plate 106$b$ is separated from the detection portion 106$c$1, whereby the switch sensor 106$c$ is switched off. In addition, when the contact 106$a$ is located in the recess 96$c$2, the other end of the elastic plate 106$b$ comes into contact with the detection portion 106$c$1, whereby the switch sensor 106$c$ is switched on.

That is, the switch sensor 106$c$ detects the neutral position where the contact 106$a$ enters the recess 96$c$2, and transmits a detection signal to the control device 28. The control device 28 performs various types of control based on the detected neutral position.

As shown in FIG. 2, the first shift shaft 98 of the shift shaft portion 74 constitutes one of shift shafts 97, and is connected to a lower portion of the shift arm 96 and extends downward. The axial length of the first shift shaft 98 is appropriately designed so that the shift mechanism 60 does not contact the flywheel 35. Further, the first shift shaft 98 is axially supported by a bearing 99 at an intermediate position in the extending direction thereof. The rotation about the axis is made smooth based on the rotational motion of the shift arm 96.

The first gear 100 constitutes a rotation transmission mechanism 101 together with the second gear 102 that transmits the rotational motion of the first shift shaft 98 to the second shift shaft 104. The first gear 100 includes a coupling portion 100$a$ coupled to a lower end portion of the first shift shaft 98, and a fan-shaped portion 100$b$ extending from the coupling portion 100$a$ in a predetermined direction (rearward direction of the outboard motor 10), and includes a plurality of first tooth portions 100$b$1 on an arc-shaped outer periphery of the fan-shaped portion 100$b$. The fan-shaped portion 100$b$ of the first gear 100 rotates (swings) clockwise or counterclockwise along with the rotation of the first shift shaft 98.

The second gear 102 is formed in substantially the same shape as the first gear 100, and includes a coupling portion 102$a$ to which an upper end portion of the second shift shaft 104 is coupled, and a fan-shaped portion 102$b$ extending from the coupling portion 102$a$ in a predetermined direction (forward direction of the outboard motor 10). Second tooth portions 102$b$1 that mesh with the first tooth portions 100$b$1 are formed on an arc-shaped outer periphery of the fan-shaped portion 102$b$. That is, due to the meshing between the first tooth portions 100$b$1 and the second tooth portions 102$b$1, rotational motion of the first gear 100 is transmitted to the second gear 102, and the second shift shaft 104 is rotated (swung) about its axis.

The second shift shaft 104 constitutes the other of the shift shafts 97, and extends downward from the second gear 102 for a short distance and has a lower end portion coupled to an upper end of the operation shaft 62. The connection portion between the second shift shaft 104 and the operation shaft 62 is pivotally supported by a bearing 105, and rotation of the second shift shaft 104 about its axis is smoothly transmitted to the operation shaft 62.

The shift mechanism 60 of the outboard motor 10 according to the present embodiment is basically configured as described above. The operation thereof will be described below.

Upon receiving an operation of the operating portion (for example, a shift lever) by the user, the control device 28 of the outboard motor 10 controls driving of the actuator 64 to rotate or stop rotation of the operation shaft 62. For example, when the user moves the shift lever from the neutral position to the forward position, the actuator 64 moves the movable rod 64$a$ forward.

Figure 9A:
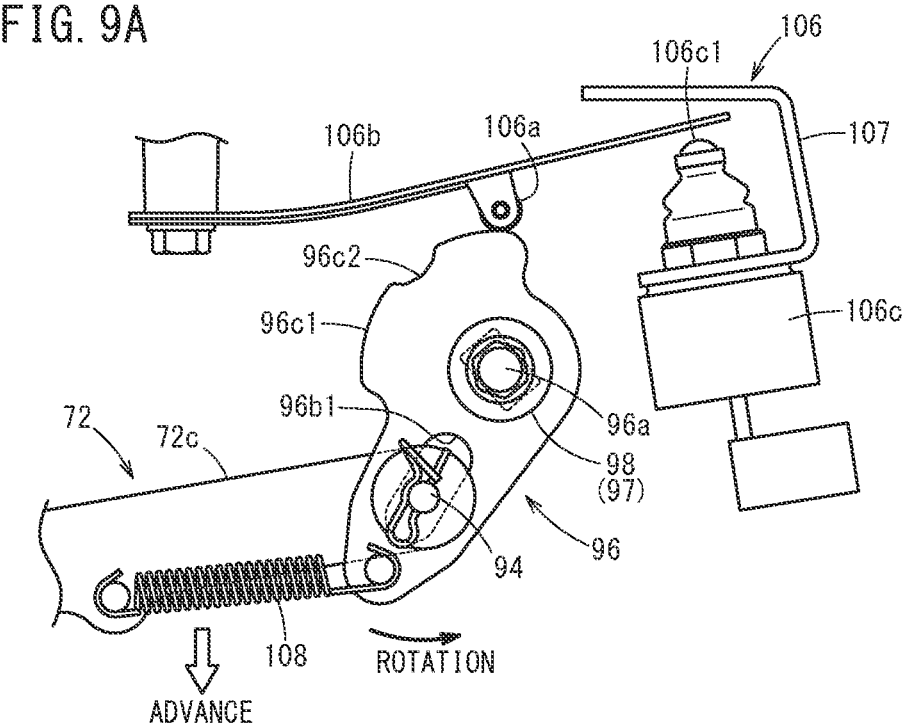
FIG. 9A is a plan view showing the operation of the link rod and the shift arm during the forward operation.

As a result, as shown in FIG. 9A, the sliding body 82 connected to the distal end portion of the movable rod 64$a$ is also displaced. At this time, the shift pivot 88 is guided along the guide opening 80$b$1 of the guide body 80, and the link rod 72 coupled to the shift pivot 88 is also displaced forward along the guide opening 80$b$1. When the link rod 72 is displaced forward, the link pin 94 pushes and rotates the shift arm 96 while moving inside the link hole portion 96$b$1 in the direction toward the distal end. As a result, the shift arm 96 rotates counterclockwise about the rotation center portion 96$a$. During this rotation, the contact 106$a$ located in the recess 96c2 moves to the outer edge 96c1, whereby the neutral detecting unit 106 does not detect the neutral position.

Further, by the counterclockwise rotation of the shift arm 96, the first shift shaft 98 and the first gear 100 are rotated counterclockwise. As a result, the second gear 102 that meshes with the first gear 100 rotates clockwise, and the second shift shaft 104 and the operation shaft 62 rotate clockwise in accordance with this rotation of the second gear 102.

Then, as shown in FIG. 1, the clockwise rotation of the operation shaft 62 advances the shift slider 42 of the transmission mechanism 24. As a result, the dog clutch 48 engages with the forward driven bevel gear 46a, and the propeller shaft 50 rotates in a direction allowing the hull Sh to move forward as the forward driven bevel gear 46a rotates.

Figure 9B:
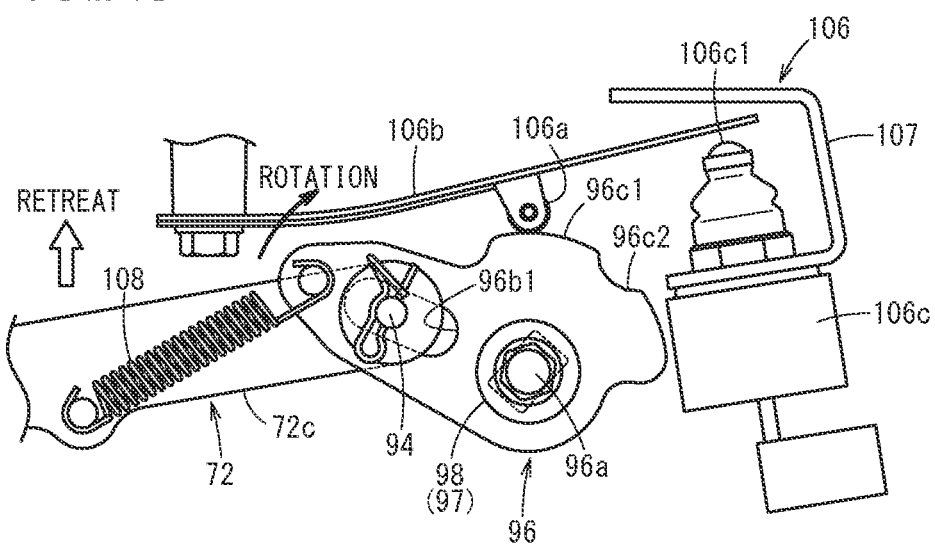
FIG. 9B is a plan view showing the operation of the link rod and the shift arm during the backward operation.

Conversely, when the user moves the shift lever from the neutral position to the reverse position, the actuator 64 moves the movable rod 64a backward. As a result, the sliding body 82 (shift pivot 88) moves backward while being guided along the guide opening 80b1 of the guide body 80. As shown in FIG. 9B, the link rod 72 is also displaced backward along the guide opening 80b1. When the link rod 72 is displaced backward, the shift arm 96 of the shift shaft portion 74 rotates clockwise about the rotation center portion 96a. As a result, the contact 106a located in the recess 96c2 moves to the outer edge 96c1.

By the clockwise rotation of the shift arm 96, the first shift shaft 98 and the first gear 100 are rotated clockwise. Therefore, the second gear 102 that meshes with the first gear 100 rotates counterclockwise, and the second shift shaft 104 and the operation shaft 62 also rotate counterclockwise. Then, as shown in FIG. 1, counterclockwise rotation of the operation shaft 62 causes the shift slider 42 of the transmission mechanism 24 to move backward. As a result, the dog clutch 48 engages with the backward driven bevel gear 46b, and the propeller shaft 50 rotates in a direction allowing the hull Sh to move backward as the backward driven bevel gear 46b rotates.

Further, as shown in FIGS. 3 and 10, in addition to the shift mechanism 60 described above, a cable shift mechanism 112 that performs shift switching by converting forward and backward motion of a mechanical cable 110 into rotational motion can be applied to the outboard motor 10. That is, a mount structure 118 of the outboard motor 10 includes, in the engine body 39, the actuator mounting portion 76 for fixing the actuator bracket 68, and a cable mounting portion 116 for fixing a cable bracket 114 that holds the cable shift mechanism 112. The mount structure 118 is configured to be able to selectively fix one of the actuator bracket 68 (including the guide body 80) or the cable bracket 114.

Specifically, in the cable shift mechanism 112, two cables 110 extend rearward from a distal end of the cover 12. One of the two cables 110 is a shift cable 110a for operating shifting of the transmission mechanism 24, and the other is a throttle cable 110b for operating a throttle (not shown) of the engine 20. Each cable 110 is connected to the shift lever (not shown) of the outboard motor 10, and advances and retreats based on the operation of the shift lever.

The cable bracket 114 includes a plate-shaped fixed plate portion 114a extending in the up-down direction on a side surface of the engine body 39, a piece portion 114b bent short at an upper end of the fixed plate portion 114a, and a plate-shaped extending portion 114c bent in the horizontal direction at a lower portion of the fixed plate portion 114a.

The fixed plate portion 114a is fixed to a lower portion of the crankcase 38. The cable mounting portion 116 includes a plurality of fastening sections (first to third fastening sections 116a to 116c) for fixing the fixed plate portion 114a. The first fastening section 116a is provided at a position above the extending portion 114c and higher than a pulley 122 described later. The second and third fastening sections 116b and 116c are provided at positions lower than the extending portion 114c (a lowermost end portion of the engine body 39).

The piece portion 114b holds a pair of connection cables 120 connected to the throttle. The pair of connection cables 120 extend from the location where the connection cables 120 are held by the piece portion 114b, and extend around both peripheral edges of the pulley 122 located on the lower side, the respective end portions thereof being undetachably fixed to an end portion gripping body 124 provided on the pulley 122. The end portion gripping body 124 swings along with the advance and retreat of the throttle cable 110b, thereby performing an operation of pulling one of the pair of connection cables 120 and pushing out the other to adjust the throttle opening degree of the engine 20.

Figure 11:
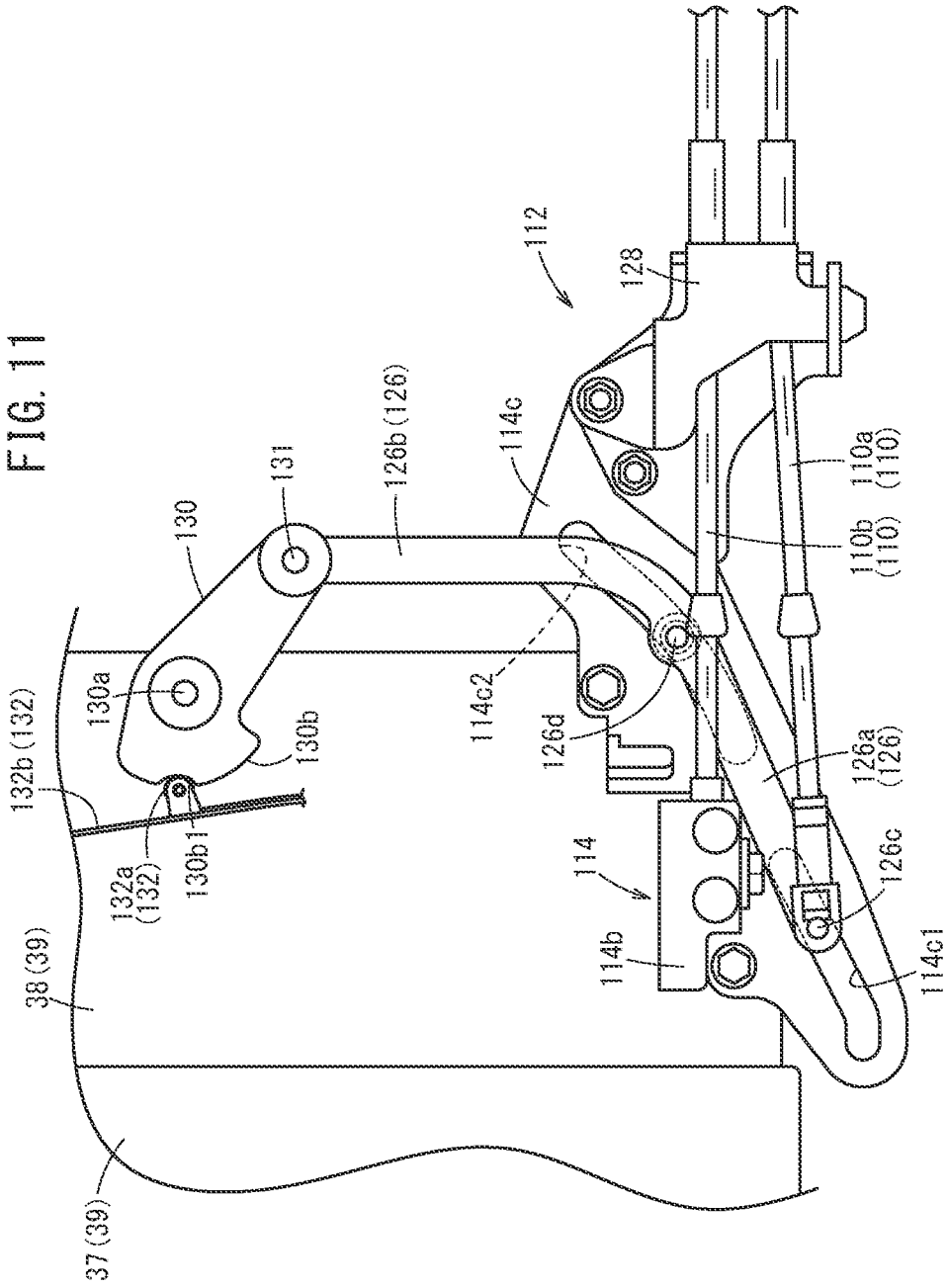
FIG. 11 is a plan view of the cable shift mechanism.

As shown in FIG. 11, a guide opening 114c1 and a guide opening 114c2 for guiding a link rod 126 are formed in the extending portion 114c of the cable bracket 114. The guide opening 114c1 serves to guide a rear end portion of the link rod 126. The guide opening 114c2 serves to guide a front end portion of the link rod 126. In the link rod 126, a pin 126c inserted into the guide opening 114c1 is set such that no clearance is provided in the width direction of the guide opening 114c1. On the other hand, in the link rod 126, a pin 126d inserted into the guide opening 114c2 is set such that a slight clearance is provided in the width direction of the guide opening 114c2 in plan view, and no clearance is provided in the thickness direction of the guide opening 114c2 (set not to be displaced in the up-down direction). Further, a holder 128 for holding the midway position of the pair of cables 110 is provided at a front portion of the extending portion 114c.

The link rod 126 is formed in a V-shape that surrounds the crankcase 38 in plan view. An extension rod 126a, which is one of extension rods of the link rod 126, is guided along the guide opening 114c1. The shift cable 110a is connected to a proximal end of the extension rod 126a, and the link rod 126 slides on the guide opening 114c1 along with the forward and backward movement of the shift cable 110a. An extension rod 126b, which is the other of the extension rods of the link rod 126, is displaced along a direction in which the extension rod 126a is guided by the guide opening 114c1 (a direction inclined forward and inward).

A shift arm 130 is connected to an end portion of the link rod 126 (extension rod 126b) via a link connection structure 131. As the end portion of the link rod 126 is displaced, the shift arm 130 rotates about a rotation center portion 130a. As a result, the displacement of the link rod 126 is converted into rotational motion in the shift arm 130, and a shift shaft (not shown) coupled to the shift arm 130 is rotated about its axis.

Similarly to the shift mechanism 60, the shift arm 130 is provided with a neutral detecting unit 132. That is, an outer edge 130b of the shift arm 130 is also provided with a recess 130b1. By a contact 132a of the neutral detecting unit 132 entering the recess 130b1 based on the action of an elastic plate 132b, the neutral detecting unit 132 detects the neutral position.

Figure 8B:
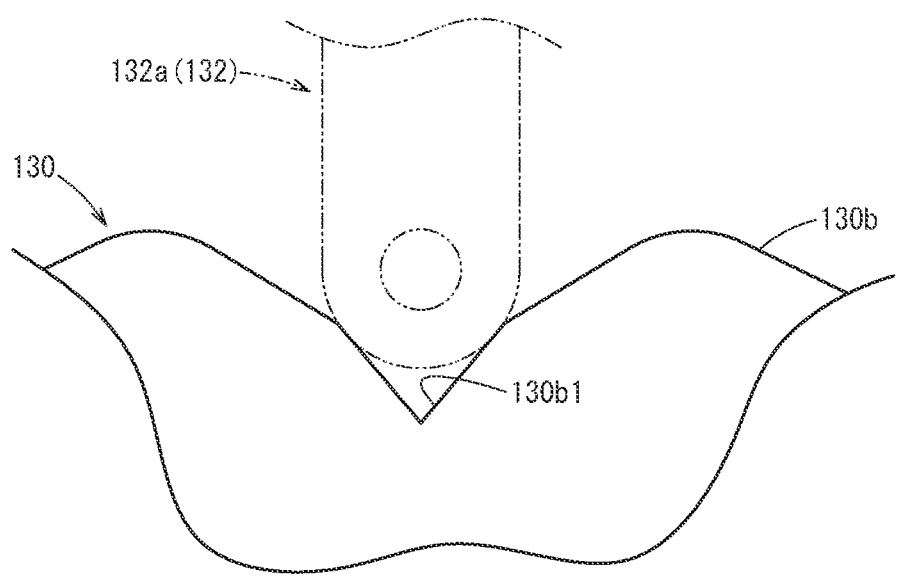
FIG. 8B is an enlarged plan view showing a recess of a shift arm of a cable shift mechanism.

The recess 130b1 is formed in a polygonal shape as shown in FIG. 8B, but is formed in a shape different from that of the recess 96*c*2. More specifically, the recess 130*b*1 has an obtuse valley part at the innermost portion closest to the rotation center portion 130*a*. The recess 130*b*1 has a pair of corner portions that are bent inward from a pair of lines each connecting the valley part and a boundary between the recess 130*b*1 and the outer edge 130*b*. The recess 130*b*1 formed in this manner allows the contact 132*a* to come out of the recess 130*b*1 when the shift arm 130 rotates.

Note that the present invention is not limited to the above-described embodiment, and various modifications can be made along the gist of the invention. For example, in the present embodiment, the shift shaft portion 74 has a configuration in which the plurality of shift shafts 97 (the first shift shaft 98 and the second shift shaft 104) are employed, but the present invention is not limited thereto. For example, one shift shaft 97 may be coupled to the rotation center portion 96*a* of the shift arm 96, and this shift shaft 97 may be directly coupled to the operation shaft 62.

Technical ideas and effects that can be grasped from the above embodiment will be described below.

A first aspect of the present invention includes an electric actuator 64 configured to cause a movable portion (movable rod 64*a*) to make linear motion, a guide structure 70 that includes a sliding body 82 connected to the movable portion and is configured to guide linear motion of the sliding body 82, a link rod 72 connected to the sliding body 82, and bent and extending in a direction different from a direction of the linear motion of the sliding body 82, and a shift shaft portion 74 connected to the link rod 72, and configured to make rotational motion based on displacement of the link rod 72 and switch between forward movement and backward movement based on the rotational motion.

Since the shift mechanism 60 of the outboard motor 10 includes the guide structure 70, the link rod 72, and the shift shaft portion 74, the shift mechanism 60 driven by the electric actuator 64 can be disposed by effectively utilizing a limited space in the outboard motor 10. That is, the shift mechanism 60 has a structure that transmits, via the link rod 72, the linear motion of the movable portion (movable rod 64*a*) to the shift shaft portion 74 positioned in a direction different from the direction of the linear motion, and is disposed along the side and front portion of the engine 20. As a result, the shift mechanism 60 can further promote miniaturization of the outboard motor 10, and for example, the electric actuator 64, the guide structure 70, and the link rod 72 can be disposed within the range of the upper cover 56. Therefore, during maintenance or in an emergency, the user of the outboard motor 10 can easily access the shift mechanism 60 and perform work.

Further, the shift shaft portion 74 includes a shift arm 96 connected to the link rod 72 via a link connection structure 73, and a shift shaft 97 connected to the shift arm 96 and extending downward. The link connection structure 73 includes a link hole portion 96*b*1 provided in the shift arm 96, and a link pin 94 of the link rod 72, the link pin 94 being connected to the link rod 72 and disposed in the link hole portion 96*b*1, and configured to move in the link hole portion 96*b*1 based on the displacement of the link rod 72. The shift mechanism 60 can smoothly convert the linear motion of the link rod 72 into the rotational motion of the shift arm 96 by the link connection structure (the link hole portion 96*b*1 of the shift arm 96, and the link pin 94 of the link rod 72).

Further, the shift shaft 97 includes a first shift shaft 98 coupled to a rotation center of the shift arm 96 and configured to rotate along with rotational motion of the shift arm 96, and a second shift shaft 104 connected to the first shift shaft 98 via a rotation transmission mechanism 101, rotation of the first shift shaft 98 being transmitted to the second shift shaft 104. Accordingly, in the shift mechanism 60, since the shift shaft portion 74 is constituted by two shafts (the first and second shift shafts 98 and 104), the degree of freedom of layout can be further increased. For example, it is possible to easily adopt a configuration in which the flywheel 35 is avoided in the shift shaft portion 74.

Further, the shift shaft portion 74 includes a neutral detecting unit 106, the shift arm 96 includes a recess 96*c*2 at a predetermined position on an outer edge 96*c*1, and the neutral detecting unit 106 detects a neutral position of the transmission mechanism 24 by a contact 106*a* of the neutral detecting unit 106 being inserted into the recess 96*c*2 when the shift arm 96 rotates. Thus, the shift mechanism 60 can accurately detect the neutral position of the transmission mechanism 24.

Further, the recess 96*c*2 is formed in a polygonal shape in plan view. As a result, in the shift mechanism 60, entry of the contact 106*a* into the recess 96*c*2 is facilitated. Further, in the configuration to which the electric actuator 64 is applied, it is important to suppress an error in detection of the neutral position of the transmission mechanism 24. For this reason, in the recess 96*c*2, a steep inclined surface is disposed in a portion close to the outer edge 96*c*1. On the other hand, in the configuration to which the cable 110 is applied, a steep inclined surface is disposed close to the valley part in the recess 130*b*1, and thus it is possible to improve user's shift feeling.

The shift mechanism further includes a bracket (actuator bracket 68) configured to fix the electric actuator 64. The bracket is fixed to a mounting portion (actuator mounting portion 76) provided at a lower portion of an engine 20 of the outboard motor 10. Accordingly, when the user opens the upper cover 56 that covers the engine 20, the shift mechanism 60 can be exposed, and the operation can be easily performed.

Further, the bracket (actuator bracket 68) is formed in a plate shape and fastened to the mounting portion (actuator mounting portion 76) via fixing bolts 78*c*, and an elastic member 78*d* is disposed on each of both surfaces of the bracket at each of fastening sections 76*a* to 76*c* where the fixing bolts 78*c* are fastened. Thus, the shift mechanism 60 can suppress the vibration of the mounting portion by the elastic member 78*d*.

The sliding body 82 includes a coupling member 84 connected to the movable portion (movable rod 64*a*) and extending along the movable portion, a pivot plate 86 stacked on the coupling member 84, and a shift pivot 88 stacked on the pivot plate 86 and coupled to the link rod 72. The guide structure 70 includes a guide body 80 fixed to the outboard motor 10, and the guide body 80 includes an opening (guide opening 80*b*1) extending along a direction of linear motion of the movable portion and configured to guide the shift pivot 88. Thus, the shift mechanism 60 can smoothly convert the displacement of the link rod 72 into rotational motion by causing the sliding body 82 to slide by the linear motion of a distal end portion of the movable portion and guiding the sliding of the sliding body 82.

Further, the coupling member 84, the pivot plate 86, the shift pivot 88, and the link rod 72 are fastened by a connecting bolt 90, and the coupling member 84 is formed with a long hole 84*a*1 into which the connecting bolt 90 is inserted. Accordingly, the position of the link rod 72 with respect to the movable portion (movable rod 64*a*) can be favorably adjusted.

Thus, the elastic member 78d an elastic body 108 is provided between the link rod 72 and the shift shaft portion 74. As a result, the elastic body 108 can assist displacement of the shift shaft portion 74 to the neutral position when the link rod 72 is displaced, and can suppress rattling accompanying conversion from the linear motion to the rotational motion.

The movable portion (movable rod 64a) is formed in a rod shape, and a manually operated portion (through hole 64a1) is provided in a vicinity of an extending end of the movable portion. As a result, in the event of an emergency or the like, the user operates the manually operated portion, whereby the shift mechanism 60 can be manually operated and gear shifting can be forcibly performed.

A second aspect of the present invention is a mount structure 118 of a shift mechanism 60 (cable shift mechanism 112) provided at a position near an engine 20 in which a piston (connecting rod 32) and a crankshaft 34 are housed in an engine body 39, wherein one of an actuator bracket 68 or a cable bracket 114 is allowed to be selectively fixed to the engine body 39, the actuator bracket 68 being configured to hold an electric actuator 64 configured to cause a movable portion (movable rod 64a) to make linear motion, and the cable bracket 114 being configured to hold a cable shift mechanism 112 configured to convert forward and backward motion of a cable 110 into rotational motion, the cable bracket 114 is fixed to a crankcase 38 of the engine body 39, and the actuator bracket 68 is fixed across a cylinder block 37 and the crankcase 38 above the cable bracket 114.

Thus, in the mount structure 118 of the outboard motor 10, the shift mechanism 60 of the electric actuator 64 and the cable shift mechanism 112 can be selectively applied to the engine body 39, and the manufacturing cost can be reduced. Further, since the shift mechanism 60 and the cable shift mechanism 112 are disposed by effectively utilizing the limited space around the engine 20, it is possible to promote miniaturization of the outboard motor 10. Further, for example, the shift mechanism 60 and the cable shift mechanism 112 can be visually confirmed only by removing the upper cover 56 covering the engine body 39 of the outboard motor 10, thereby facilitating maintenance work. In particular, since the actuator bracket 68 is disposed above the cable bracket 114, even the shift mechanism 60 having a large structure can be favorably disposed around the engine body 39.

What is claim is:

1. A shift mechanism of an outboard motor, comprising:
an electric actuator configured to cause a movable portion to make linear motion;
a guide structure that includes a sliding body connected to the movable portion and is configured to guide linear motion of the sliding body;
a link rod connected to the sliding body, and bent and extending in a direction different from a direction of the linear motion of the sliding body; and
a shift shaft portion connected to the link rod, and configured to make rotational motion based on displacement of the link rod and switch between forward movement and backward movement based on the rotational motion,
wherein the shift shaft portion includes a shift arm connected to the link rod via a link connection structure, and a shift shaft connected to the shift arm and extending downward,
wherein the link connection structure includes a link hole portion provided in the shift arm, and a link pin of the link rod, the link pin being connected to the link rod and disposed in the link hole portion, and configured to move in the link hole portion based on the displacement of the link rod, and
wherein the shift shaft includes:
a first shift shaft coupled to a rotation center of the shift arm and configured to rotate along with rotational motion of the shift arm; and
a second shift shaft connected to the first shift shaft via a rotation transmission mechanism, rotation of the first shift shaft being transmitted to the second shift shaft.

2. A shift mechanism of an outboard motor, comprising:
an electric actuator configured to cause a movable portion to make linear motion;
a guide structure that includes a sliding body connected to the movable portion and is configured to guide linear motion of the sliding body;
a link rod connected to the sliding body, and bent and extending in a direction different from a direction of the linear motion of the sliding body; and
a shift shaft portion connected to the link rod, and configured to make rotational motion based on displacement of the link rod and switch between forward movement and backward movement based on the rotational motion,
wherein the shift shaft portion includes a shift arm connected to the link rod via a link connection structure, and a shift shaft connected to the shift arm and extending downward,
wherein the link connection structure includes a link hole portion provided in the shift arm, and a link pin of the link rod, the link pin being connected to the link rod and disposed in the link hole portion, and configured to move in the link hole portion based on the displacement of the link rod,
wherein the shift shaft portion includes a neutral detecting unit,
wherein the shift arm includes a recess at a predetermined position on an outer edge thereof, and
wherein the neutral detecting unit detects a neutral position of a transmission mechanism by a contact of the neutral detecting unit being inserted into the recess when the shift arm rotates.

3. The shift mechanism of the outboard motor according to claim 2, wherein
the recess is formed in a polygonal shape in plan view.

4. A shift mechanism of an outboard motor, comprising:
an electric actuator configured to cause a movable portion to make linear motion;
a guide structure that includes a sliding body connected to the movable portion and is configured to guide linear motion of the sliding body;
a link rod connected to the sliding body, and bent and extending in a direction different from a direction of the linear motion of the sliding body;
a shift shaft portion connected to the link rod, and configured to make rotational motion based on displacement of the link rod and switch between forward movement and backward movement based on the rotational motion; and
a bracket configured to fix the electric actuator,
wherein the bracket is fixed to a mounting portion provided at a lower portion of an engine of the outboard motor,
wherein the bracket is formed in a plate shape and fastened to the mounting portion via a fixing bolt, and wherein an elastic member is disposed on each of both surfaces of the bracket at a fastening section where the fixing bolt is fastened.

5. A shift mechanism of an outboard motor, comprising:
an electric actuator configured to cause a movable portion to make linear motion;
a guide structure that includes a sliding body connected to the movable portion and is configured to guide linear motion of the sliding body;
a link rod connected to the sliding body, and bent and extending in a direction different from a direction of the linear motion of the sliding body; and
a shift shaft portion connected to the link rod, and configured to make rotational motion based on displacement of the link rod and switch between forward movement and backward movement based on the rotational motion,
wherein the sliding body includes:
a coupling member connected to the movable portion and extending along the movable portion;
a pivot plate stacked on the coupling member; and
a shift pivot stacked on the pivot plate and coupled to the link rod,
wherein the guide structure includes a guide body fixed to the outboard motor, and
wherein the guide body includes an opening extending along a direction of linear motion of the movable portion and configured to guide the shift pivot.

6. The shift mechanism of the outboard motor according to claim 5, wherein
the coupling member, the pivot plate, the shift pivot, and the link rod are fastened by a connecting bolt, and
the coupling member is formed with a long hole into which the connecting bolt is inserted.

7. The shift mechanism of the outboard motor according to claim 1, wherein
an elastic body is provided between the link rod and the shift shaft portion.

8. The shift mechanism of the outboard motor according to claim 1, wherein
the movable portion is formed in a rod shape, and a manually operated portion is provided in a vicinity of an extending end of the movable portion.

* * * * *